United States Patent [19]
Bernardi et al.

[11] Patent Number: 6,101,338
[45] Date of Patent: *Aug. 8, 2000

[54] SPEECH RECOGNITION CAMERA WITH A PROMPTING DISPLAY

[75] Inventors: Bryan D. Bernardi, Rochester; Thomas M. Stephany, Churchville; Jeffery R. Hawver, Rochester, all of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/169,384

[22] Filed: Oct. 9, 1998

[51] Int. Cl.[7] ........................................................ G03B 17/24
[52] U.S. Cl. .......................... 396/287; 396/292; 396/429
[58] Field of Search .................................. 396/281, 283, 396/287, 289–292, 295, 439, 429; 704/200, 231, 246, 247, 251, 252, 271, 275

[56] References Cited

U.S. PATENT DOCUMENTS

| | | | |
|---|---|---|---|
| 4,951,079 | 8/1990 | Hoshino et al. | 354/412 |
| 5,386,494 | 1/1995 | White | 704/275 |
| 5,546,145 | 8/1996 | Bernardi et al. | 354/76 |
| 5,668,928 | 9/1997 | Groner | 704/251 X |

*Primary Examiner*—David M. Gray
*Attorney, Agent, or Firm*—David M. Woods

[57] ABSTRACT

A speech recognition camera 10 comprises a camera body 11 for providing a protective housing; a display (20, 25, 30) disposed on the camera body 11; a microphone 15 for receiving voice commands; and a microcontroller 40 disposed in said camera body 11 that signals said display (20, 25, 30) to display initial words or phrases representative of voice commands pre-programmed in said microcontroller 40, and to display a pull-down menu, upon receiving any of the initial words or phrases, containing preprogrammed words or phrases that are voice commands, and that are further descriptive of the initial words or phrases.

19 Claims, 2 Drawing Sheets

SPEECH RECOGNITION CAMERA WITH A PROMPTING DISPLAY

FIELD OF THE INVENTION

This invention relates generally to the field of cameras, but more specifically to the arrangement of a camera having speech recognition capabilities for controlling the camera, and a display for prompting the user of available commands.

BACKGROUND OF THE INVENTION

When a camera with speech recognition capabilities is used by a consumer, the camera responds to user inquiries and operating commands by virtue of the spoken word. This capability is known in prior art such as U.S. Pat. No. 4,951,079 by Hoshino et. al. It is also known to have a speech recognition camera with several vocabularies and word sets for the purposes of annotation of images, such as in U.S. Pat. No. 5,546,145 by Bernardi et. al.

Current speech recognition technology does not allow for large vocabularies (65,000 words) or continuous naturally speaking speech recognition in a consumer product as small and inexpensive as a camera. Therefore, cameras with speech recognition capabilities generally have small word sets (10 to 15 words) and a discrete speech characteristic. There could be several small word sets, but the speech recognition camera could only be listening for one set at a time.

In a camera with several voice command words, it is required that the user remember the words or phrases which are available to speak into the camera. Furthermore, the word sets may be structured into a hierarchy such that one has to remember where one is in the hierarchy to know which words are valid at the current level of the hierarchy. Although the presently known and utilized cameras are satisfactory, they are not without drawbacks. The above-described prior art for cameras of this nature does not address the issue of aiding the user in remembering the available command set.

SUMMARY OF THE INVENTION

The present invention is a camera with a text display for prompting the user with available commands to be spoken. In a preferred embodiment of this invention, the present invention uses a display with available commands that are scrolled through a display. For example, a set of camera command words such as "Zoom In", "Zoom Out", "Flash Off", "Flash On", "Set Date" are the words that are programmed into the camera. These words will be scrolled in the display, and the user is prompted to help remind the user of the currently valid commands.

It is an alternate embodiment of this invention to include a large display that lists all currently available commands. In this case, a whole set of words will be displayed statically. In all embodiments of the present invention, the available command word sets will change based upon the commands for which the camera is currently listening. For instance, the camera may be listening for annotation words such as, "Vacations", "Holidays", "Annual Events", and "Special Events". As these words are displayed to remind the user, the user speaks the word "Holidays" to the camera. Following receiving the word "Holidays", the camera changes mode and starts listening for the word set of "New Years", "Easter", "Christmas", "Thanksgiving", "Hannakuh", etc. This now available word set is then displayed to the user for reminding the user for the next word to speak.

In yet another embodiment of the present invention, a display that is more graphical is required. This would be a display depicting a GUI (Graphical User Interface) such as is common in the PC (personal computer) industry. The camera will use the display to show the user which command words are available as he navigates through the various word sets. This will happen much like a computer user navigates through a menu structure on a PC.

DETAILED DESCRIPTION OF THE INVENTION

Figure 1:
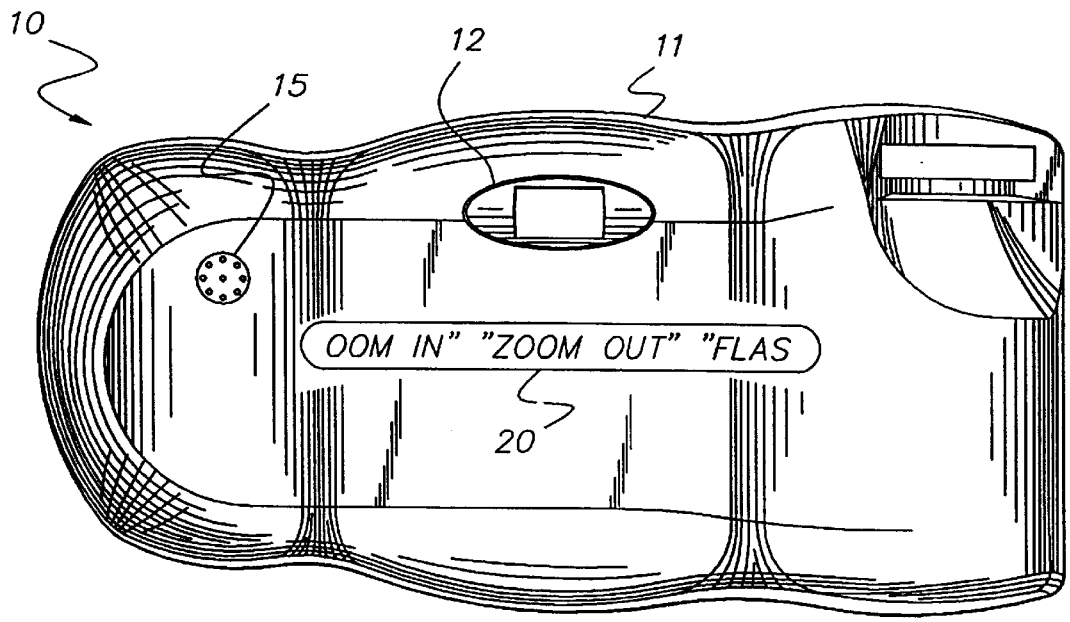
FIG. 1 is a rear view of the camera showing a single line scrolling text display according to the present invention.

FIG. 1 is the rear view of a speech recognition camera 10 having a camera body 11 for providing a protective housing and a viewfinder 12 that the user looks through for viewing the scene to be captured. A means for capturing the image (not shown) is disposed inside the camera body 11, either film in an analog camera or an image sensor in a digital camera. The camera 10 is capable of speech recognition and includes a microphone 15 for inputting of voice commands, and a one line scrolling text display 20 as presented in the preferred embodiment of the present invention. The scrolling text display 20 continually scrolls in the direction of the arrow, as shown in FIG. 1, prompting the user for voice commands available to the user during the current mode. For example, the command words scrolling by the user could be "Zoom In", "Zoom Out", and "Flash On" as illustrated in the scrolling text display 20 of FIG. 1. The commands that have not yet scrolled into view, such as "Flash Off", "Take Picture", etc, are not shown. The command set will continue to scroll and repeat. Upon issuing a command, the user is prompted with another set of scrolling words for the next mode. This continues until a desired action is acted upon by the camera 10.

Figure 2:
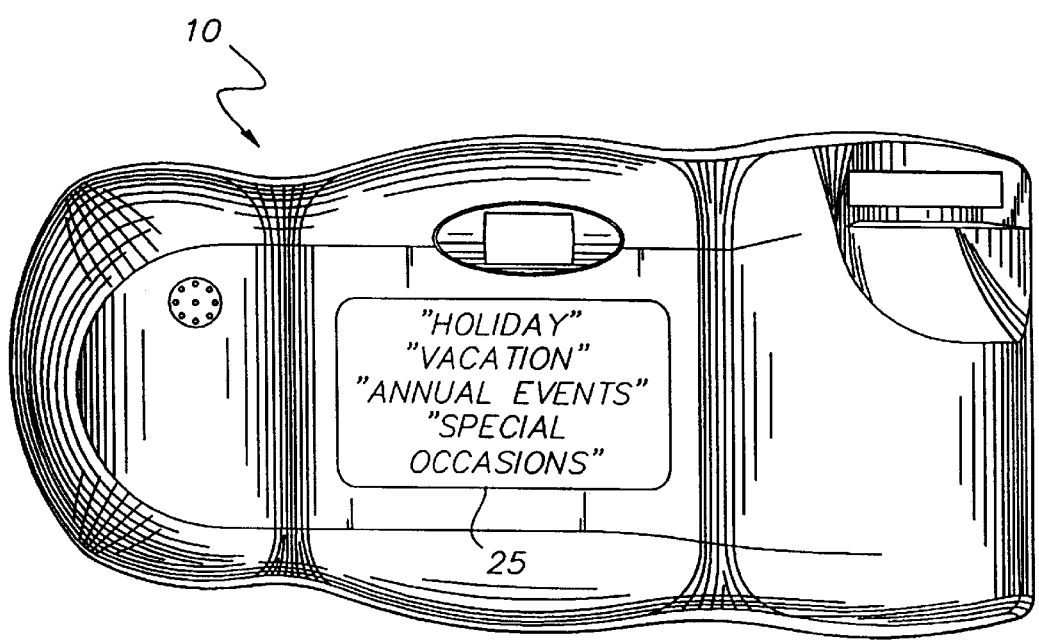
FIG. 2 is a rear view of the camera showing a multiple line static text display according to the present invention.

FIG. 2 is the rear view of the speech recognition camera 10 showing a multiple line static text display 25. The display will show at a particular moment in time all commands available to the user for speaking. For example the display 25 shows the commands "Holiday", "Vacation", "Annual Events" and "Special Occasions" prompting the user to say one of these commands. Once one of these words is spoken, for example the word "Holiday", the user is next prompted with various holidays in the display, such as, "Christmas", "New Years", etc. Finally, the chosen annotation command, such as "Christmas", is stored in the camera's memory 50 (see FIG. 4) for eventual printing on the hardcopy of the image. It is understood that the particular image is associated with the chosen annotation command, in this case "Christmas".

Figure 3:
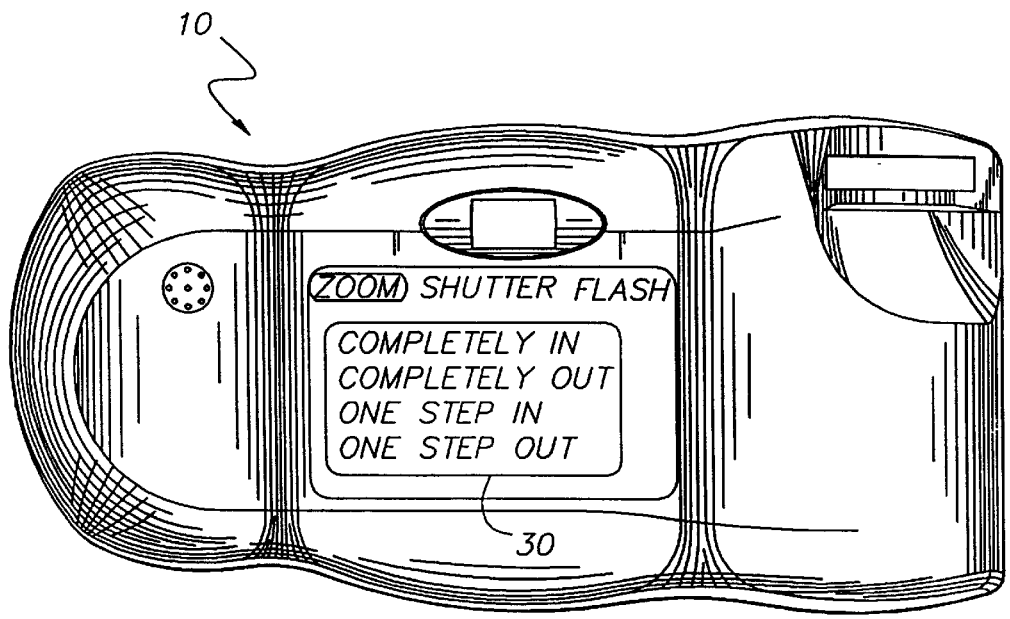
FIG. 3 is a rear view of a camera showing a graphic display according to the present invention.

FIG. 3 is another rear view of the speech recognition camera 10 with a graphical display 30. This graphical display 30 is used for permitting the user to navigate through a menu of voice commands. Initially, the voice commands available are shown in the top menu, as the user speaks subsequent commands, a pull-down menu is displayed below top menu and the next set of available commands are shown. For example, the top menu could show commands such as "Zoom", "Shutter", and "Flash". As illustrated in FIG. 3, upon speaking the "Zoom" command, a pull-down menu is displayed showing a subset of zoom related functional commands such as "Completely In", "Completely Out", "One Step In", and "One Step Out". Finally, the functional command, such as "Completely Out", will cause the camera microcontroller 40 (see FIG. 4) to send a signal to the zoom motor 60 (see FIG. 4) causing the zoom lens (not shown) to zoom completely out. This type of graphical user interface will offer a user-friendly approach to using voice commands in a camera.

Referring again to FIG. 3, graphical display 30 also shows mode commands such as "Flash", and "Shutter". When the user chooses the "Flash" mode command, a set of mode commands will pop down such as "Fill", "Auto", "On", or "Off" (not shown). For example, when the user chooses the mode command "Off" a flag is set in the microcontroller 40 which disables the flash (not shown). It is understood that the "Shutter" mode command will operate similar to the "Flash" mode command.

Figure 4:
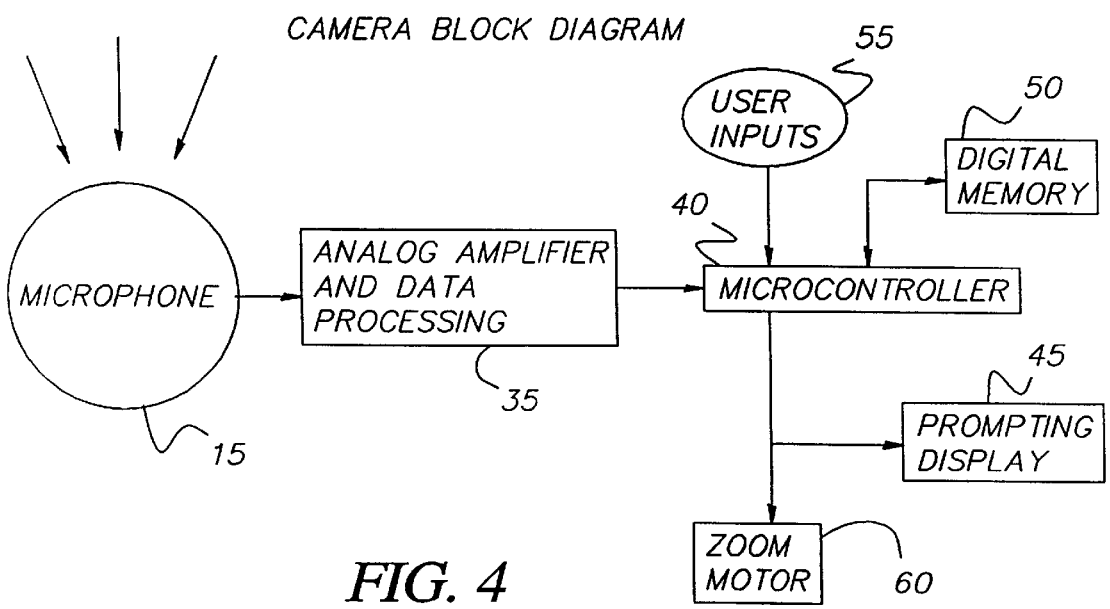
FIG. 4 is a block diagram of the electronics in the camera of the present invention.

FIG. 4 is a block diagram of the voice recognition camera 10 of the present invention. The user inputs voice commands into the microphone 15, and the voice is amplified by the analog amplifier and data processing 35. A microcontroller 40 is programmed to recognize the voice command, and to send the initial prompting words to the prompting display 45. The microcontroller 40 is also programmed to signal the prompting display 45 to display the predetermined, pre-programmed pull-down menu when any of the initial words are received by the microcontroller 40 through via the microphone 15. A chip such as a Sensory RSC-164 chip can be used for the microcontroller 40. The microcontroller 40 sends voice commands as needed to the prompting display 45, which could be comprised of any of the aforementioned displays 20, 25, or 30. The digital memory 50 is used to store reference word sets to be used by the speech recognition algorithms, and for storage of data for the various prompting displays 45. User inputs 55 are user inputs such as a shutter button, zoom switch, or the like.

A plurality of motors 60 (only one is shown) are electrically connected to the microcontroller 40 for implementing the function represented by the received voice command. For example, for functional commands, the zoom motor 60 would be actuated for controlling the "Zoom In", and "Zoom Out" functions. In other instances, for annotation commands, such as "Christmas" a flag is set in the camera for printing at a later time.

Although the present invention has been fully described with reference to the preferred embodiments thereof, many modifications and variations thereof will be apparent to those skilled in the art without departing from the spirit and scope thereof. For example, the words "one increment in" may be substituted for "one step in."

Parts list 10 speech or voice recognition camera
11 camera body
12 viewfinder
15 microphone
20 scrolling text display
25 multiple line static text display
30 graphical display
35 analog amplifier and data processing
40 microcontroller
45 prompting display
50 digital memory
55 user inputs
60 zoom motor

What is claimed is:

1. A camera comprising:
    (a) a camera body for providing a protective housing;
    (b) a display disposed on the camera body;
    (c) a microphone for receiving voice commands; and,
    (d) a microcontroller disposed in said camera body that signals said display to display initial words or phrases representative of an initial set of voice commands pre-programmed in said microcontroller, and to display a pull-down menu, upon receiving any of the initial words or phrases, containing a subset of preprogrammed words or phrases that are voice commands pre-programmed in said microcontroller, and that are further descriptive of the initial set of words or phrases.

2. The camera as in claim 1, wherein the initial set of words or phrases are either continuously scrolling on said display or are statically displayed on said display.

3. The camera as in claim 1, wherein the initial set of words or phrases are either annotation, functional or setting commands.

4. The camera as in claim 1 further comprising a pull-down menu containing further descriptive words or phrases that are structured into a hierarchy further related to the initial words or phrases.

5. The camera as in claim 4, wherein the pull-down menu includes either annotation, functional or setting commands.

6. A camera comprising:
    (a) a camera body for providing a protective housing;
    (b) a display disposed on the camera body;
    (c) a microphone for receiving voice commands; and,
    (d) a microcontroller disposed in said camera body for causing said display to display, prior to receiving any voice commands, words or phrases representative of a set of voice commands pre-programmed in said microcontroller.

7. The camera as claimed in claimed in claim 6 wherein the displayed words or phrases are initial words or phrases representative of words or phrases in an initial set of voice commands that the microcontroller is capable of recognizing.

8. The camera as claimed in claim 7 wherein the microcontroller further displays a pull-down menu, upon receiving any of the initial words or phrases, containing a subset of preprogrammed words or phrases that are voice commands pre-programmed in said microcontroller, and that are further descriptive of the initial set of words or phrases.

9. The camera as in claim 6 wherein the set of words or phrases are statically displayed on said display.

10. The camera as in claim 6 wherein the set of words or phrases are continuously scrolling on said display.

11. The camera as in claim 6 wherein the set of words or phrases are either annotation, functional or setting commands.

12. The camera as in claim 8 wherein the pull-down menu includes either annotation, functional or setting commands.

13. A camera comprising:
    (a) a camera body for providing a protective housing;
    (b) a display disposed on the camera body;

(c) a microphone for receiving voice commands; and, (d) a microcontroller disposed in said camera body for causing said display to display, prior to receiving any voice commands, all words or phrases representative of a complete set of available, currently valid voice commands pre-programmed in said microcontroller.

14. The camera as claimed in claimed in claim 13 wherein the displayed words or phrases are initial words or phrases representative of words or phrases in an initial set of voice commands that the microcontroller is capable of recognizing.

15. The camera as claimed in claim 14 wherein the microcontroller further displays a pull-down menu, upon receiving any of the initial words or phrases, containing a subset of preprogrammed words or phrases that are voice commands pre-programmed in said microcontroller, and that are further descriptive of the initial set of words or phrases.

16. The camera as in claim 13 wherein the set of words or phrases are statically displayed on said display.

17. The camera as in claim 13 wherein the set of words or phrases are continuously scrolling on said display.

18. The camera as in claim 13 wherein the set of words or phrases are either annotation, functional or setting commands.

19. The camera as in claim 15 wherein the pull-down menu includes either annotation, functional or setting commands.

\* \* \* \* \*